(12) United States Patent
Berg et al.

(10) Patent No.: US 8,489,445 B1
(45) Date of Patent: Jul. 16, 2013

(54) DETERMINING AND DISPLAYING ITEM PREFERENCES ASSOCIATED WITH GEOGRAPHIC AREAS

(75) Inventors: Christel C. Berg, Seattle, WA (US);
Thomas L. Nissley, Seattle, WA (US);
John D. Rodgers, Seattle, WA (US);
Tobias J. Roseman, Seattle, WA (US);
Jana A. Kleitsch, Burien, WA (US);
Ruchica Behl, Austin, TX (US)

(73) Assignee: Amazon Technologies, Inc., Reno, NV (US)

( * ) Notice: Subject to any disclaimer, the term of this patent is extended or adjusted under 35 U.S.C. 154(b) by 1161 days.

(21) Appl. No.: 12/339,933

(22) Filed: Dec. 19, 2008

(51) Int. Cl.
*G06Q 30/00* (2012.01)

(52) U.S. Cl.
USPC ......................................................... 705/7.34

(58) Field of Classification Search
USPC ......................................................... 705/7.34
See application file for complete search history.

(56) References Cited

U.S. PATENT DOCUMENTS

| | | | |
|---|---|---|---|
| 6,385,622 B2 * | 5/2002 | Bouve et al. | 707/770 |
| 7,069,232 B1 * | 6/2006 | Fox et al. | 705/7.31 |
| 7,930,218 B1 * | 4/2011 | Gregov et al. | 705/26.8 |
| 2005/0251408 A1 * | 11/2005 | Swaminathan et al. | 705/1 |
| 2009/0164294 A1 * | 6/2009 | Hu et al. | 705/10 |
| 2009/0307263 A1 * | 12/2009 | Skibiski et al. | 707/103 R |
| 2010/0079336 A1 * | 4/2010 | Skibiski et al. | 342/357.07 |

* cited by examiner

*Primary Examiner* — Mark A Fleischer
(74) *Attorney, Agent, or Firm* — Thomas | Horstemeyer, LLP (57) ABSTRACT

This disclosure relates to determining and displaying item preferences associated with geographic areas. Each of a plurality of item selections is associated with a respective geographic location. Item selections associated with a geographic area are identified. A preference for an item from among a group of items is determined based on the identified ones of the item selections. The preference is sent to a client for rendering.

29 Claims, 9 Drawing Sheets

DETERMINING AND DISPLAYING ITEM PREFERENCES ASSOCIATED WITH GEOGRAPHIC AREAS

BACKGROUND

A merchant that provides a variety of items may wish to determine customer preferences for certain items or products based upon item sales, rentals, leases, downloads, or other consumption activities. This is done, for example, to determine needed inventory of those items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The system described herein relates to determining customer preferences associated with particular geographic areas or items. An item may be a product, service, advertisement, network page, social networking profile, search query, keyword or phrase used in tagging, image, audio clip, video clip, digital content item, or any other item that may be associated with a preference that may be determined by monitoring user activity on a network resource. Customers of a merchant residing within one geographic area may prefer one item as compared to customers of the merchant residing in another geographic area who may prefer a different item. Such preferences may relate to particular items or to groups of items. Customer preferences may be determined, for example, by which particular items are sold, rented, and/or leased to customers, by which items are downloaded, by which items are reviewed, by which items are tagged with keywords, by which items are discussed on a discussion board, by which items are selected for rendering, for example, in a display of a network page, or by any other method for determining item selections. Rendering may be defined as the process of generating an image in a computer system. The generated image may be, for example, saved, printed, displayed to a user on a monitor, etc.

Item selections may be associated with geographic areas based on, for example, a shipment or billing address of the customer, a geographic area associated with an Internet Protocol (IP) address of a client, or any other of a variety of methods for determining a location of a customer. By associating item selections with geographic areas, the system described herein may determine and display item preferences for the geographic areas to users. In the following discussion, a general description of the system and its components is provided, followed by a discussion of the operation of the same.

Figure 1:
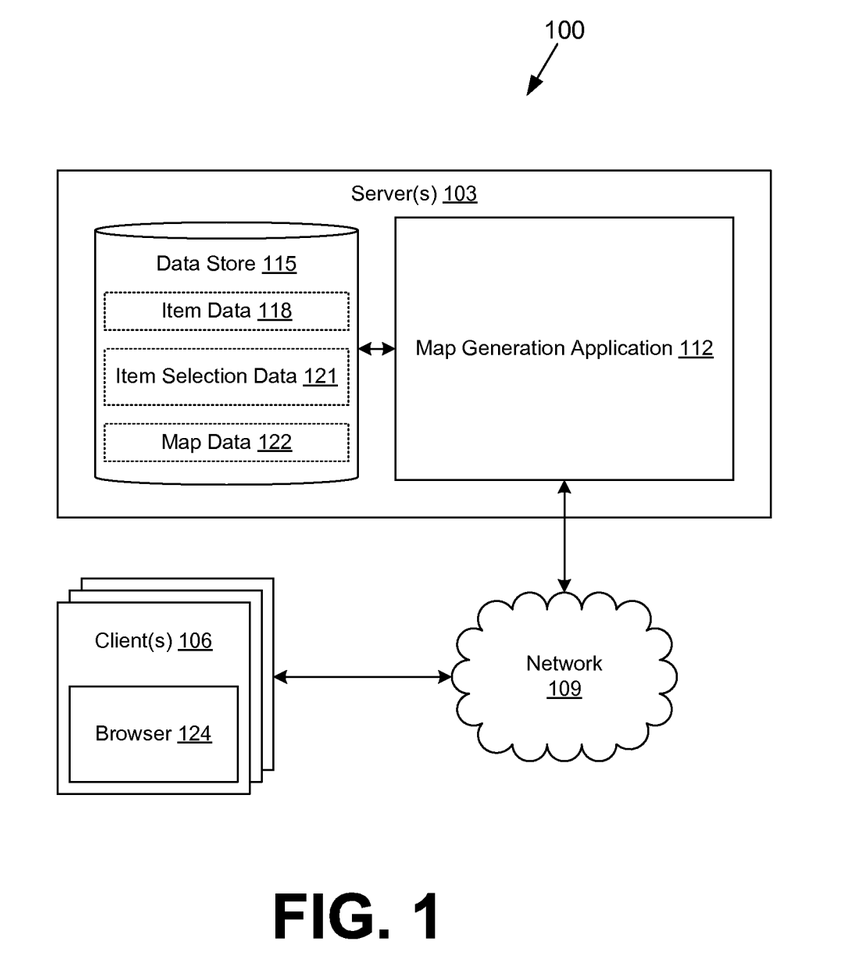
FIG. 1 is a drawing of a networked environment according to various embodiments of the present disclosure.

With reference to FIG. 1, shown is a networked environment 100 according to various embodiments of the present disclosure. The networked environment 100 includes one or more servers 103 that are in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The server 103 may comprise, for example, one or more server computers or other like systems that employ one or more processor circuits. To this end, the one or more servers 103 may be implemented in one or more locations in the form of server banks, or other arrangements. Such servers 103 may be located in a single installation or may be distributed among multiple geographically diverse locations. To the extent that the server 103 employs one or more processor circuits, the server 103 comprises a processor-based system. Although the server 103 may be referred to in the singular in the discussion that follows, it is understood that the server 103 may represent multiple servers that may be arranged, for example, in one or more server banks or other arrangements.

The server 103 includes a map generation application 112 and potentially other applications. The map generation application 112 may be employed to determine preferences for items and/or groups of items associated with geographic areas and to encode maps for rendering to users. Also, the server 103 includes a data store 115 and potentially other data stores, which may comprise data and applications operable to provide access to the data. The data store 115 may be used to store item data 118, item selection data 121, map data 122, and potentially other data.

The item data 118 may include, for example, item names, item images, item descriptions, and any other data that may be used to describe or otherwise relate to items. Also included in the item data 118 may be associations between items and groups of items. For example, an item that is a book for children may be associated with a group of items called "children's books." As another example, an item that is environmentally friendly may be associated with a group of items called "green items." Conversely, an item that is not environmentally friendly may be associated with a group of items called "brown items." Such groups of items may represent meaningful categories, groupings merely for convenience, or other reasons. An item may be associated with a plurality of groups of items or no groups of items.

The item selection data 121 may describe a plurality of item selections. An item selection may be anything that suggests a preference of a customer for a certain item. For example, an item ordered, downloaded, purchased, rented, and/or leased by a customer may be considered an item selection. As another example, a network page associated with an item and retrieved by a customer may also be considered an item selection for that item. Additionally, items reviewed by customers, discussed on a message board or forum, searched for in a search engine, and/or tagged with one or more keywords may be considered item selections for those items. In some embodiments, keywords used in tagging or within a search query may comprise a selection of those keywords as items. There are many forms of item selections beyond those described here.

The item selection data 121 may also contain associations between an item selection and geographic areas, such as addresses, which may include street addresses, mailing addresses, cities, states, zip codes, counties, districts, countries, and/or any other form of address information. Such associations may also comprise latitude and longitude expressed by coordinates and/or any other data used to express a geographic location.

Geographic locations may be associated with item selections in many ways. For example, an item order may include a list of items ordered, at least one billing or shipping address of a customer, a location provided by a device enabled to use a global navigation satellite system (GNSS) such as the global positioning system (GPS), and potentially other data. In another example, a customer may provide a response to a direct question such as "What geographic area are you most closely associated with?" In another example, an item network page view may be associated with an address by, for example, using cookies and stored account information. Alternatively, an item network page view may be associated with an address by using some type of geolocation method for an IP address of a client associated with the item network page view. In addition, many other methods may exist for associating geographic locations with item selections.

Map data 122 may include data relating to geographic areas and potentially other data. It may include, for example, a listing of zip codes within a geographic area to allow the map generation application 112 to make a determination as to whether a particular address associated with an item selection in the item selection data 121 is located within or is otherwise associated with a given geographic area. It may include, for example, boundaries of geographic areas expressed in coordinates. Such a geographic area definition may allow the map generation application 112 to determine mathematically whether a given location expressed in coordinates, the location being associated with an item selection in the item selection data 121, is located within a given geographic area. Many other methods may be employed for defining locations and geographic areas and determining whether a given location is within a given geographic area.

It is also understood that the server 103 may be employed to execute other applications and access other data beyond those described above.

Each of the clients 106 may comprise, for example, a computer system such as a desktop, laptop, or other computer system. The clients 106 may also comprise personal digital assistants, cellular telephones, set-top boxes, or other systems with like capability. Further, the clients 106 may also comprise any device that is network capable that may communicate with the server 103 over the network 109 to perform various functions. Such clients 106 may comprise, for example, processor-based devices having processor circuits comprising a processor and a memory.

The clients 106 may be configured to execute various applications such as a browser 124 and/or other applications. The browser 124 may be executed in a client 106, for example, to access and render network pages, such as web pages, or other network content served up by the server 103 and/or other servers.

Next, a general description of the operation of the various components of the networked environment 100 is provided. A client 106 associated with a user sends a request for information over the network 109 to the map generation application 112. This request may be initiated by the user through the browser 124 or any other application running on the client 106. For example, the user may click on a hyperlink embedded within a network page. The user may also initiate this request by typing, for example, a uniform resource location (URL) into the browser 124.

Many methods exist for sending a request from a client 106 over the network 109 to the map generation application 112, and many of these requests may be performed automatically without any user intervention. The request may be sent over the network 109 by using, for example, hypertext transfer protocol (HTTP), simple mail transfer protocol (SMTP), file transfer protocol (FTP), and/or any other protocol used for sending data over a network. Additionally, the request may involve multiple requests generated by the user interacting with, for example, an active or interactive web page. In some cases, requests may be generated automatically based on anticipated user action. There are many methods for creating active or interactive web pages, such as Ajax and/or any other technique.

A client 106 may request, for example, a network page that includes a map displaying one or more geographic areas, where the map displays preferences for items or groups of items determined based on item selection data 121 and map data 122. The request may specify parameters used in generating the map by specifying, for example, which geographic areas within a larger geographic area should be displayed, display preferences including colors, sizes, and any other display preferences, a time period used to filter the item selection data 121, and/or any other data that may be used to control the rendering of the map or the computation of the item preferences and/or item group preferences.

In response to the request or requests, or, in some embodiments, automatically, the map generation application 112 sends data over the network 109 to the client 106. Portions of the data may be displayed, for example, in the browser 124 or another application. The received data may be rendered to the user immediately, stored on the client 106 for later use, or processed in some other way. The data may be sent by the map generation application 112 on the server 103 over the network 109 to the client 106 using any network transport protocol, such as HTTP, SMTP, FTP, or any other such protocol. The data may include hypertext markup language (HTML), extensible markup language (XML), flash, images, videos, and/or any other type of data.

The map generation application 112 may determine a preference of a geographic area for a particular item from among a group of items or for a particular group of items out of several groups of items or all items. This may involve identifying item selections associated with the geographic area based upon a geographic location of each selection. Such preferences may be determined for multiple geographic areas and/or for multiple groups of items. In some embodiments, the method for determining item preferences may use one or more thresholds for a minimum and/or maximum number of item selections in the determination.

One example of a preference may be the item with the most sales, rentals, leases, and/or downloads in a geographic area from among a group of items. Likewise, item selections based on item network page views may be used to determine items that are the most popular in a geographic area from among a group of items. Determination of preferences may, in some cases, consider different types of item selections, such as item sales, item network page views, etc. In some cases, the preference may actually represent a least popular item in a geographic area from among a group of items. The least popular item may be, for example, the item from among the group of items with the fewest sales and/or fewest item network page views, etc. The least popular item could also be determined by identifying the item having the lowest conversion rate, for example, items that are viewed in a network page but not ultimately ordered, downloaded, rented, purchased, leased, etc.

Another type of item preference may be a local favorite item, which may seek to capture the difference in relative popularity of an item from among a group of items in a geographic area as compared with a larger geographic area encompassing the geographic area. For example, the map generation application 112 may select an item as the local favorite item for a geographic area out of a group of items by selecting the item with the greatest deviation between local selections and overall selections. In this example, local selections may be the percentage of the selections for the item from among a group of items in a local geographic area, while overall selections may be the percentage of the selections for the item from among the group of items in a larger geographic area encompassing the local geographic area.

To illustrate, one may want to determine the local favorite children's book in the state of Georgia. The map generation application 112 may compute the local favorite children's book in Georgia by choosing the children's book with the greatest deviation between local selections and national selections. Local selections may be calculated as the percentage of children's book sales in Georgia that the particular book represents. National selections may be calculated as the percentage of children's book sales in the entire United States that the particular book represents. Alternatively, national selections may be calculated as the mean percentage of children's book sales in each state that the particular book represents.

Other methods may be available for determining such a local favorite item, including the use of a geometric distribution and/or comparing the selections of the item per capita with other geographic areas. In some embodiments, the local favorite item may be predetermined out of a group of items. In such a case, the preference associated with the local favorite item may represent the relative strength of the preference of one geographic area for the predetermined item as compared to other geographic areas or a larger geographic area encompassing the geographic area. Furthermore, other methods for determining preferences for a particular item out of a group of items in a geographic area may be available. Additionally, local favorite groups of items representing preferences for groups of items relative to all item selections or a subset thereof may be determined in like manner as desired.

Data sent to the client 106 by the map generation application 112 may also include instructions for how the client 106 is to render the preferences to the user. As a non-limiting example, the instructions may comprise instructions to the browser 124 to render a region to the user including a description of the item preferred within a particular geographic area from among a group of items. The region may comprise a window, frame, table, or other display region.

The region may display, for example, the item image, the item title, the item description, the item price, the number of item selections for that item within the geographic area, and/or any other information about the item and the geographic area. The region may also include the percentage of sales of that item within the group of items in that particular geographic area. The region may also display preferences for items from other groups of items. The region may, for example, be rendered when the user clicks on or otherwise selects a depiction of a particular geographic area, or it may be rendered automatically.

The data sent from the map generation application 112 over the network 109 to the client 106 may also include a map of a geographic area or multiple geographic areas. The map generation application 112 may encode, for example, a map of a geographic area displaying an indication of a proportion of the quantity of item selections for at least one group out of the item selections identified to the geographic area. The map may also contain multiple geographic areas, or in a particular embodiment, a larger geographic area encompassing smaller geographic areas. The map generation application 112 may use the item selection data 121 generated during a specific time period provided by the client 106 or during a time period automatically determined by the map generation application 112.

As a non-limiting example, the map may depict the United States, with each state indicating a proportion of item selections within that state for each of several groups of items. For example, there may be two groups of items: "green items" that are environmentally friendly and "brown items" that are not environmentally friendly. Each state on the map of the United States may be marked with an indication of what proportion of item selections were for green items and/or brown items out of the total number of item selections in that state for either green items or brown items. Such an indication may be a color, a pattern, indicia, and/or any other type of visual or non-visual indication. If the indication is a color, in this particular example, the color may be a mixture of green and brown depending upon the proportion of item selections for green or brown items respectively. Therefore, a state preferring green items may be colored green, a state preferring brown items may be colored brown, and a state with an equal preference may be colored equally green and brown using, for example, a gradient, pattern, or any other indication of a mixture of colors.

As another non-limiting example, the map generation application 112 may encode a map depicting the United States, with each state indicating a proportion of book sales for "religious books" out of all book sales in the state. Alternatively, or additionally, the map may indicate, for example, the absolute quantity of religious books sold in each particular state. Each state may have a color or pattern indicating the preference for religious books within that particular state. Which color, pattern, or other indication is chosen for a state may depend on thresholds configured relative to the quantity of item sales or selections in that state. Such a map may, for example, include the entire United States or only a portion of the United States.

As another non-limiting example, the map generation application 112 may encode a map depicting the United States, with each state indicating a proportion of politically related item selections associated with, for example, a blue group and a red group. In this example, items associated with the Democratic Party, Democratic candidates, liberal ideology, and/or other items may be associated with the blue group. Items associated with the Republican Party, Republican candidates, conservative ideology, and/or other items may be associated with the red group. Some items in the item selection data 121 may be associated with both blue and red groups, whereas other items may be associated with neither group. Preferences for items or groups of items may or may not consider item selections for unassociated items in determining preferences. Such a map may depict, for example, states associated with a preference for items from the blue group as blue states and states associated with a preference for items from the red group as red states. Such a map may include, for example, the entire United States or only a portion of the United States.

In one embodiment, items may be associated with groups based on user tagging of the items with keywords that may be associated with one or more groups. To illustrate, an item tagged by users with keywords such as "right wing," "conservative," and/or "Republican" may be associated with the red group. Likewise, an item tagged by users with keywords such as "left wing," "liberal," and/or "Democratic" may be associated with the blue group. Some items may be tagged with, for example, both "conservative" and "liberal" and may be associated with both red and blue groups. In one embodiment, a tagging of an item with one or more keywords may itself comprise an item selection based upon which preferences may be determined and maps may be generated.

As another non-limiting example, the map generation application 112 may encode a map depicting the United States, with each state indicating a proportion of item selections associated with each of four college basketball teams in the Final Four tournament. The item selections may comprise, for example, sales of branded merchandise associated with one of the four teams, network page views and/or searches including search terms associated with one of the four teams, etc. Such a map may depict states associated with a preference for items associated with one of the teams by, for example, rendering the logo of the team on the state, coloring the state with one or more colors associated with the team, and/or providing some other indicia. Such a map may include, for example, the entire United States or only a portion of the United States.

As another non-limiting example, the map generation application 112 may encode a map depicting a user-defined geographic area. Such a definition may be sent as part of the request from the client 106 over the network 109 to the map generation application 112. The definition of the geographic area may include one or more of coordinates, geo-political regions, countries, zip codes, states, cities, districts, user-created or configurable shapes, and/or any other data that may be used to define a geographic area. Returning to the green/brown items example, a user may define the user-defined geographic area as his or her own zip code. In response, the map generation application 112 may encode a map depicting the chosen zip code with an indication of the proportion of item selections within that zip code as being green items or brown items. Further, the user may also obtain a preference for a particular green item or a particular brown item for the user-defined geographic area in some embodiments.

The map generation application 112 may instruct the client 106 to render the encoded map to the user in, for example, a window, frame, table, or other region within the web browser 124. Such a region may display all or part of the map, and it may be configured in such a way to allow the user to select and/or define a geographic area on the map. In response to selecting or finding a geographic area, the region may be configured to display the preferred or favorite items within one or more item groups as determined by item selections within the selected or defined geographic area.

Additionally, the browser 124 may display, within the same window or in another window, a list of items associated with one or more item groups, which may or may not be associated with the particular selected or defined geographic area. Such a region may display some or all of the items associated with the particular item group for one item group or multiple item groups. If only some of the items in an item group are displayed, they may be filtered by a threshold of item selections within either the selected or defined geographic area or all geographic areas displayed on the map. Further, the items within the item group may be ordered or not ordered.

Any of the windows or regions described above may include a user interface component for selecting a time period that may be used by the map generation application 112 to filter the item selection data 121. For example, a user may be interested in viewing the statistics over the last two weeks, over a prior month, etc. The time period selection component may include, but is not limited to, a drop-down box displaying date ranges, text fields allowing for user entry of a time period, a calendar allowing for user selection of a time period, and/or any other component for selecting a time period.

Figure 2:
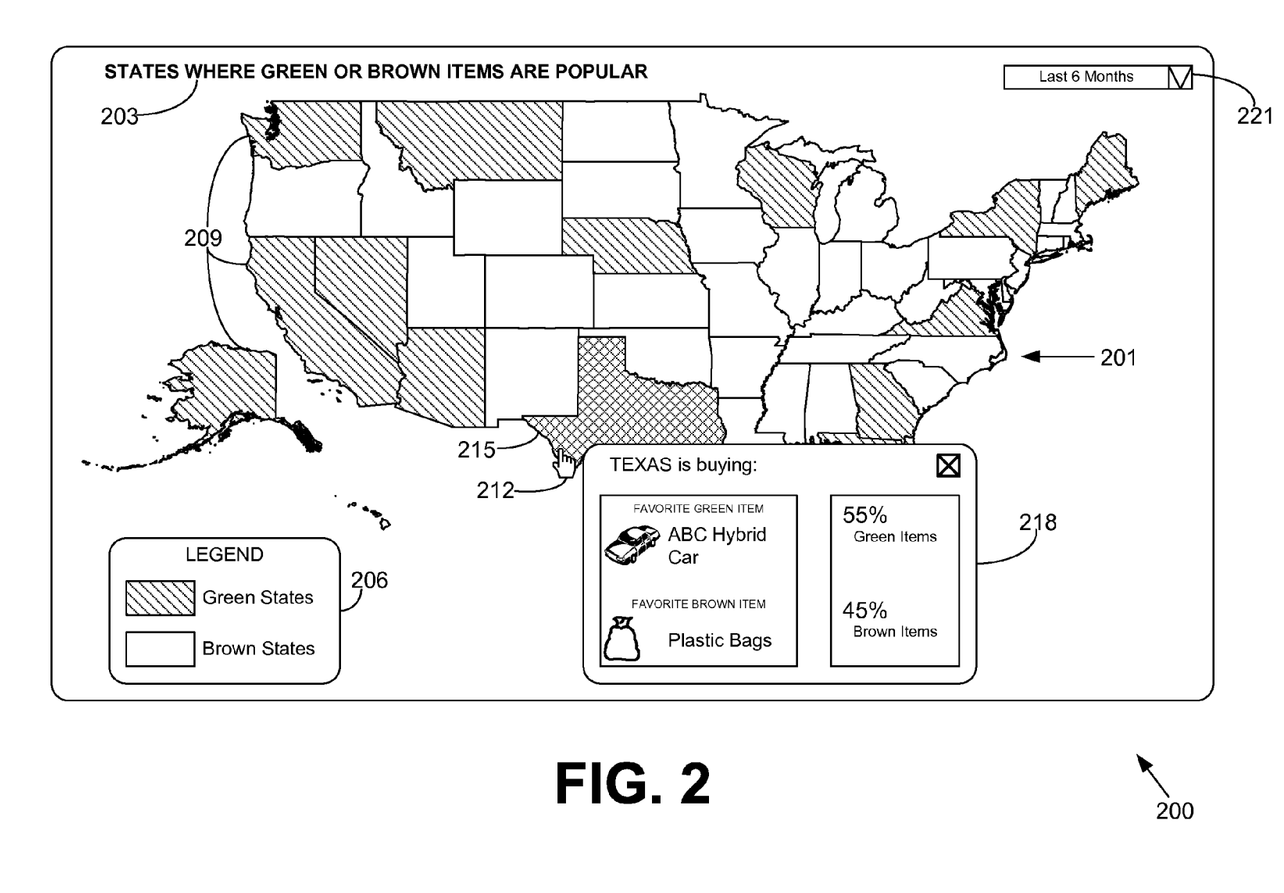
FIGS. 2-6 are drawings of examples of user interfaces rendered by a client in the networked environment of FIG. 1 according to various embodiments of the present disclosure.

Turning now to FIG. 2, shown is an example of a user interface 200 that depicts a map 201 generated by the map generation application 112 (FIG. 1) and displayed by the client 106 (FIG. 1) according to various embodiments. The user interface 200 may have a title 203 describing what is displayed on the map 201. In this example, the title 203 reads "States Where Green or Brown Items are Popular." In this embodiment, the map 201 displays which states out of the United States have a preference for green items versus brown items. Associated with the map 201 is a legend 206 showing the indications used in depicting the preference for each group of items. In one example, a preference for green items versus a preference for brown items is shown.

In legend 206, so-called "green states" are indicated by a diagonal pattern, while so-called "brown states" are indicated by having no pattern. Such preferences may be indicated by colors, indicia, and/or any other indication. Several geographic areas 209, which are states in this example, are shown with a diagonal pattern, indicating that each of the geographic areas 209 has more item selections for items that are green items than item selections for items that are brown items. Although the number of groups of items is two as depicted, the number of groups of items may be any number. If only one group of items is used, the geographic area 209 may be depicted as having a preference if, for example, the map generation application 112 determines that item selections within the group for the particular geographic area 209 exceed a threshold or otherwise predominate the selections not associated with the group. Furthermore, though only two patterns are depicted in this example, some embodiments may depict the various geographic regions having multiple patterns or multiple shades of green or brown, for example, to indicate a stronger or weaker propensity to select or purchase items of these item groups.

As shown, the user interface 200 may be rendered within the browser 124 (FIG. 1) on the client 106. In this embodiment, the user interface 200 depicts a cursor 212, which is represented by a hand. The cursor 212 may be any other type of cursor 212, such as an arrow, crosshair, hourglass, etc. In other embodiments, selection of a geographic area may be performed by means other than a cursor 212, including touch screen, voice recognition, key presses, etc. The cursor 212 is used to select a particular geographic area on the map 201.

As shown, the cursor 212 has selected a selected geographic area 215, which is the state of Texas on the map 201. The selected geographic area 215 is shown on the map 201 using a crossed diagonal pattern. In other embodiments, the selected geographic area 215 may be highlighted using a color or other indication, or it may not be highlighted at all.

Based upon the selected geographic area 215, the map generation application 112 has instructed the browser 124 to render a window 218 to the user on the client 106. The window 218 may be displayed, for example, when the user moves the cursor 212 over a selected geographic area 215, when the user otherwise selects a selected geographic area 215, or the window 218 may be always visible within the browser 124. The window 218 may be displayed within the same window as the user interface 200, or it may be displayed within a separate window of the browser 124. As shown, the window 218 is displayed as a pop-over window that is superimposed over the map 201. Alternatively, the window 218 may be a frame, table, or other display region. As shown, the window 218 is displayed near the selected geographic area 215, but the window 218 may be displayed elsewhere on the map 201 when it is displayed as a sub-window.

The user interface 200 also has a time period selection component 221 for selecting a time period. On the user interface 200 the time period selection component 221 is shown as a drop-down box, but in other embodiments the time period selection component 221 may be a calendar, text field, slider, or any other user input mechanism. In the present example, the time period selection component 221 is labeled with "Last 6 Months," specifying that the item selections that are considered in encoding the map 201 by the map generation application 112 are only those that occurred within the last six months. There may be multiple time periods to choose from in the time period selection component 221. Alternatively, the user interface 200 may display a label indicating the time period used, but not allow the user to select a time period.

Figure 3:
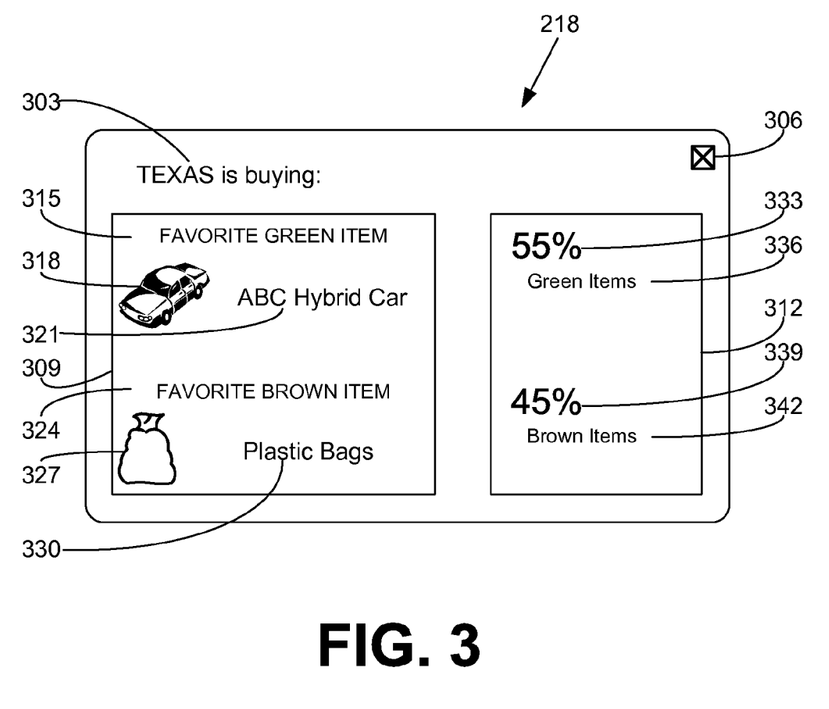

Moving now to FIG. 3, shown is a detailed depiction of the window 218 (FIG. 2) according to one embodiment. The window 218 has a label 303, a close button 306, a preferred item viewport 309, and a preferred group viewport 312. The window 218 may display fewer elements or more elements, giving more or less information about the selected geographic area 215 (FIG. 2) from the user interface 200 (FIG. 2).

In this embodiment, the label 303 reads "Texas is buying." This text refers back to the selected geographic area 215 on the map 201 (FIG. 2). The label 303 is optional, and in other embodiments, multiple labels may be used.

The close button 306 is configured to close the window 218. The close button 306 is optional. In some embodiments, the window 218 may close automatically when, for example, the user moves the cursor 212 (FIG. 2) off of the selected geographic area 215. In some embodiments, the window 218 may close, for example, upon double clicking or some other action.

The window 218 may be fixed in place relative to the user interface 200. Alternatively, in some embodiments, the window 218 may be movable relative to the user interface 200. For example, the user may be able to click once on the window 218 and drag it to another location on or beyond the user interface 200 in some embodiments.

The preferred item viewport 309 may display one or more items that are determined to be preferred items for the selected geographic area 215 by the map generation application 112 (FIG. 1). There may be, for example, one or more preferred items per item group. The preferred item viewport 309 depicts two preferred items as an example. The first preferred item has a group label 315, an item icon 318, and an item label 321. In this example, the label 315 reads "Favorite Green Item," describing the type of preference and the group of items. The item icon 318 may be, for example, a visual depiction of the preferred item for that particular item group within the selected geographic area 215. Here, a car is shown. The label 321 reads "ABC Hybrid Car," describing the preferred item for this group.

In this example, another item group appears that depicts the preferred item for the selected geographic area 215 for the other product group, Brown Products," and shown is a group label 324, an item icon 327, and an item label 330. The preferred item viewport 309 may display any number of preferred items depending upon the configuration of the map generation application 112. In some embodiments, the preferred items may be categories of items rather than particular items, with categories such as "recycled paper goods" or "fluorescent light bulbs." As a non-limiting example, "hybrid cars" may be used and may refer to all makes and models of hybrid cars, whereas "ABC Hybrid Car" may refer to a specific make and model of a hybrid car. In some embodiments, the preferred item viewport 309 may include one or more hyperlinks to access network pages associated with one or more preferred items, add one or more preferred items to a shopping cart of the user, and/or allow the user to initiate the order, download, purchase, rent, and/or lease of one or more preferred items.

The preferred group viewport 312 may contain a depiction of the relative popularity of the groups of items within the selected geographic area 215 according to the item selection data 121 (FIG. 1). The preferred group viewport 312 depicts a group popularity indicator 333 and a group label 336 pertaining, in this case, to green items. The preferred group viewport 312 also includes a group popularity indicator 339 and a group label 342 pertaining, in this case, to brown items. In other embodiments, the preferred group viewport 312 may include other information relating to group popularity and show information pertaining to any number of groups of items.

The relative arrangement of components as depicted within the window 218 is merely an example. One can contemplate any number of such arrangements that could be used to display such information to users.

Figure 4:
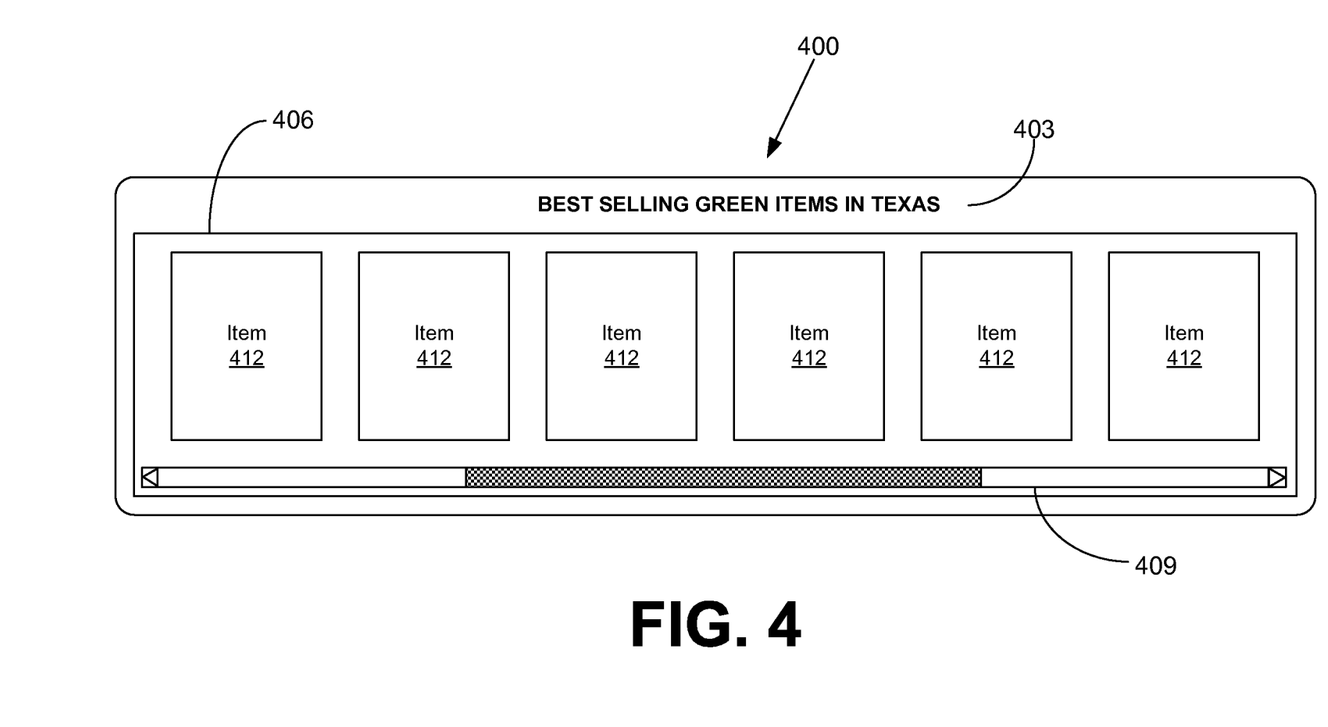

With reference to FIG. 4, shown is an item subset window 400 according to various embodiments. The item subset window 400 may appear, for example, within a network page displaying the user interface 200 (FIG. 2). In some embodiments, the item subset window 400 may be incorporated within the user interface 200. In other embodiments, the item subset window 400 may appear within a different window or network page from the user interface 200. Further, the item subset window 400 may be configured to be a pop-over or pop-up window based upon user interaction with the user interface 200. The contents of the item subset window 400 and whether the item subset window 400 is visible also may depend on user interaction with the user interface 200.

The item subset window 400 may have, for example, a label 403, a viewport 406, a scrollbar 409, a plurality of items 412, and other display components. In other embodiments, the item subset window 400 may also have a close button (not shown). The label 403 may give a description of the contents of the item subset window 400. As shown, the label 403 reads "Best Selling Green Items in Texas," and describes the plurality of items 412 displayed for the selected geographic area 215 (FIG. 2) from the user interface 200. The viewport 406 may display any number of items 412 from a group of items. If the viewport 406 is not sized large enough to render all items in the subset of the group of items, then the scrollbar 409 may appear to scroll the viewport 406. In other embodiments, there may be no scrollbar 409 or there may be multiple scrollbars 409.

The plurality of items 412 represent a subset of a group of items as determined by the map generation application 112 (FIG. 1). The subset of the group of items may relate to item selections within the selected geographic area 215. The plurality of items 412 may include all items in the group of items or a subset thereof chosen by some method, for example, best selling items, most popular new items, items with a greatest change in popularity within a time period, etc. Furthermore, the plurality of items 412 may display, in some embodiments, multiple subsets from multiple groups of items. Each item within the plurality of items 412 may include some representation of that item 412 based upon item data 118 (FIG. 1), including item title, item description, item price, item image, etc. Each item 412 in the plurality of items 412 may include, for example, hyperlinks to purchase that particular item 412.

The contents of viewport 406 may depend on user input. For example, when the user selects the selected geographic area 215 with the cursor 212 (FIG. 2) on the map 201 (FIG. 2), the subset of items 412 from a group of items may change as displayed in the viewport 406.

Figure 5:
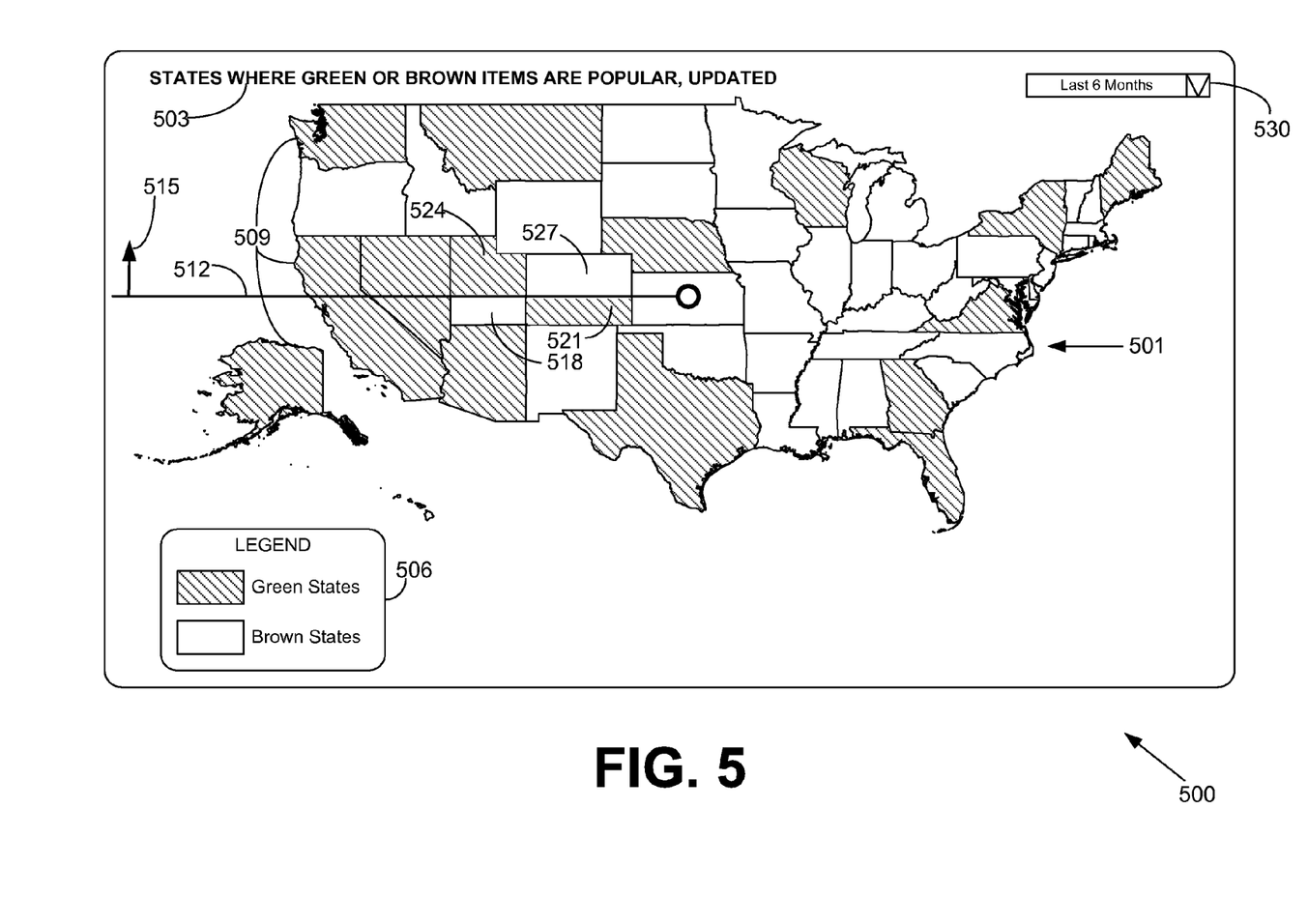

Turning now to FIG. 5, shown is a user interface 500 depicting a map 501 according to various embodiments. The map 501 is an illustration of how the map 201 (FIG. 2) may be depicted for item selection data 121 (FIG. 1) that is continuously updated. The user interface 500 includes, for example, a title 503, a legend 506, and potentially other display elements. Geographic areas 509, which are states in this example, are depicted as shaded by the map generation application 112 (FIG. 1) because the item selection data 121 indicates that the geographic areas 509 are determined to be "green states" according to the legend 506. Thus, in this example, the geographic areas 509 are displayed having the diagonal pattern associated with the group described as green states in the legend 506.

The user interface 500 may have a scan line 512 and an arrow 515. The scan line 512 may be used to indicate on the map 501 where the depiction of the data has been updated most recently. In one example, the scan line 512 rotates, and the user interface 500 updates the indicator associated with the group for the particular geographic area according to the legend 506. The arrow 515 or some other indicator may be present to show a direction of rotation. As shown, the direction of rotation for the scan line 512 is clockwise, but it may be counter-clockwise instead. In other embodiments of the user interface 500, the scan line 512 may be a horizontal, vertical, or diagonal wipe, or some other method of updating a drawing.

The map 501 may show geographic area sections 518, 521, 524, and 527, and other geographic area sections. The geographic area sections 518, 521, 524, and 527 indicate changes that have been made in the item selection data 121 since the scan line 512 last updated the map 501. As shown, geographic area section 518 has no pattern, and geographic area section 521 has a pattern. The corresponding sections of the respective geographic area sections 518 and 521 are geographic area section 524 with a pattern and geographic area section 527 without a pattern on the opposite of the scan line 512. Thus, in this fictional example, Utah, which is the state associated with geographic area sections 518 and 524, is becoming a brown state from a green state, and Colorado, which is associated with geographic area sections 521 and 527, is becoming a green state from a brown state. In alternate embodiments, the scan line 512 may update only on a geographic area basis rather than continuously updating portions of geographic areas. Additionally, breakdowns of groups associated with the geographic areas may be shown with colors, gradients, etc., other than patterns.

The user interface 500 may have a time period selection component 530 to allow the user to specify the time period for the item selection data 121 to be considered by the map generation application 112. As shown, the time period selection component 530 is a drop-down box, but other user input mechanisms are possible. With a continuously updated map 501, the time period may also be continuously updated in some embodiments.

Figure 6:
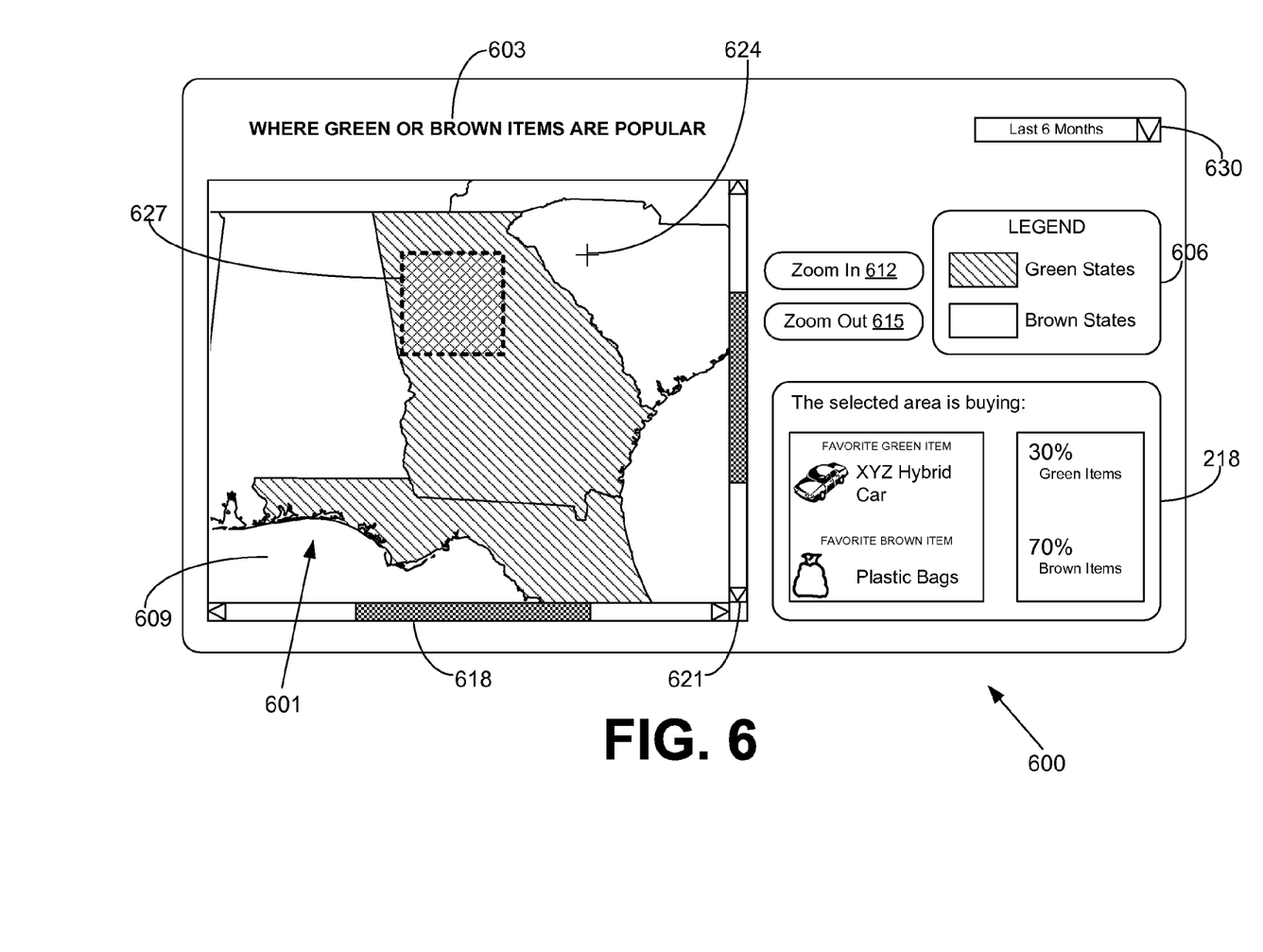

Moving now to FIG. 6, shown is a user interface 600 depicting a map 601 according to various embodiments. The user interface 600 is configured to allow a user to view detailed portions of the map 601 and select arbitrary regions. The user interface 600 may have a title 603, a legend 606, a viewport 609, a zoom-in button 612, a zoom-out button 615, and/or other components. The title 603 may include text used to describe the user interface 600 and/or the map 601. The legend 606 may include patterns, colors, and/or other indications used to indicate a group of items preferred by a geographic area. The user interface 600 may include a window 218 (FIG. 2) to describe preferences for a selected geographic area.

The viewport 609 may show a geographic area or a plurality of geographic areas which may be within a larger geographic area. The viewport 609 may have scrollbars 618 and 621 to allow the viewport 609 to render a portion of a larger map 601. The zoom-in button 612 and zoom-out button 615 may allow the user to further control the portion of the underlying map 601 rendered in the viewport 609. The zoom-in button 612 may be operable to zoom-in on such an underlying map 601, and the zoom-out button 615 may allow the user to zoom-out on the underlying map 601.

The user interface 600 may have a cursor 624 and a selected geographic area 627. The cursor 624 is shown as a crosshair but it may be any other cursor indicator. The user may be able to define the selected area by using the cursor 624 to select, for example, a rectangular area on the map 601. Alternatively, a user may be able to select a circular, elliptical, freeform, or other area. The selected geographic area 627 is shown on the map 601 as having a dashed outline. In other embodiments, the selected geographic area 627 may be shown on the map 601 in other ways. The selected geographic area 627 here is shown filled with a crosshatch diagonal pattern. In other embodiments, there may be no fill for the selected geographic area 627.

Once the user defines the selected geographic area 627, the map generation application 112 can determine statistics and/or preferences for items and groups of items for the geographic area defined within the selected geographic area 627. The statistics and/or preferences for items may change based upon the item selection data 121 associated with the selected geographic area 627. In some cases, the selected geographic area 627 may be a neighborhood or other similarly small area, and different neighborhoods may have similar or different preferences. As illustrated in the example of FIG. 6, the window 218 now shows "The selected area is buying" and depicts a preference toward brown items versus green items (70% to 30%). The favorite green item is the "XYZ Hybrid Car," while the favorite brown item is "Plastic Bags." These group and item preferences may match or differ from those of a larger geographic area, such as the state of Georgia in this example.

Once the selected geographic area 627 is defined by the user, and data describing that selection is sent from the client 106 (FIG. 1) over the network 109 (FIG. 1) to the map generation application 112 (FIG. 1), the map generation application 112 may be configured to update the statistics and/or preferences rendered within the window 218. Additionally, the map generation application 112 may be configured to instruct the client 106 to render different subsets of groups of items 412 (FIG. 4) within other windows, frames, tables, or regions, as depicted, for example, in FIG. 4.

The user interface 600 may have a time period selection component 630 to allow the user to define a time period for which the item selection data 121 will be considered. This may be a drop-down box as pictured or some other user input mechanism, such as a slider, a set of radio buttons, a set of check boxes, or other user input mechanisms.

Figure 7:
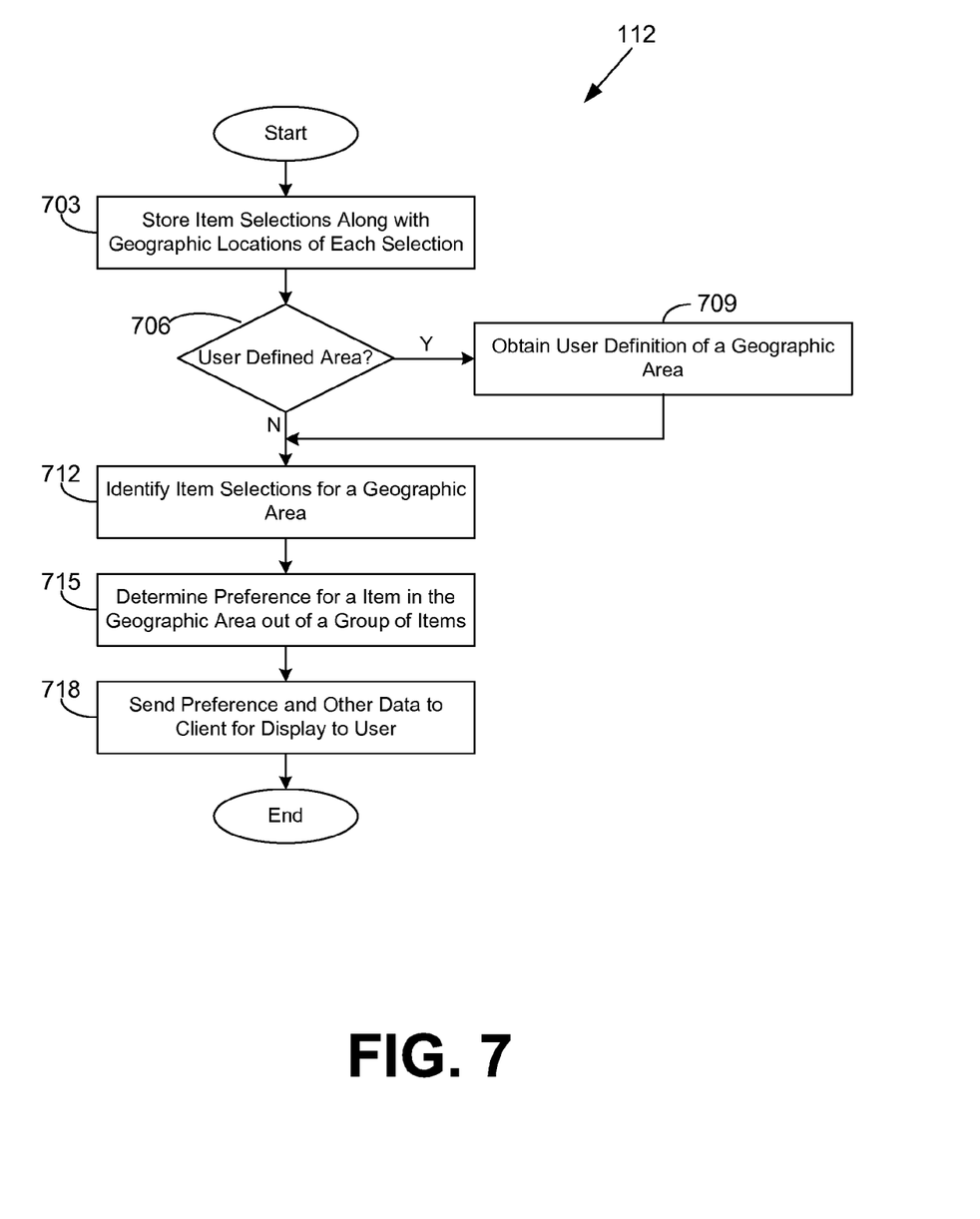
FIG. 7 depicts a flowchart that illustrates one example of functionality implemented as a portion of a map generation application executed in a server in the networked environment of FIG. 1 according to various embodiments of the present disclosure.

Turning now to FIG. 7, shown is a flowchart that provides one example of the operation of the map generation application 112 (FIG. 1) according to various embodiments. It is understood that the flowchart of FIG. 7 provides merely an example of the many different types of functional arrangements that may be employed to implement the operation of the map generation application 112 as described herein. As an alternative, the flowchart of FIG. 7 may be viewed as depicting an example of steps of a method implemented in the server 103 (FIG. 1) according to one or more embodiments.

To begin, in box 703, the map generation application 112 associates item selections with the geographic location of each selection. This may involve, for example, associating each item selection with an address from, for example, an order or an account. Alternatively, it may involve determining a geographic location of an IP address of a client 106 (FIG. 1) that has made an item selection. These associations may be performed in advance of any map generation, such as when item selections are made. In such a case, the associations may be recorded in the item selection data 121 (FIG. 1). Next, in box 706, the map generation application 112 decides whether a supplied geographic area is a user defined area such as selected geographic area 627 (FIG. 6). If the supplied area is a user defined area, then in box 709, the map generation application 112 obtains a user definition of a geographic area. Otherwise, the map generation application 112 may obtain a definition of a geographic area from within map data 122 (FIG. 1).

Now that a geographic area has been defined, in box 712, the map generation application 112 identifies item selections from the item selection data 121 that are associated with the geographic area. This may involve, for example, examining the geographic location associated with each selection and determining whether the geographic location is within the geographic area. This identification task may be performed in advance of map generation if a predefined geographic area is used. The resulting data may be stored in item selection data 121 (FIG. 1), map data 122 (FIG. 1), or some other location.

In box 715, the map generation application 112 determines a preference for an item in the geographic area out of a group of items. Such a preference may be based purely on popularity within the item selections, or may be based on a greatest positive deviation from the mean popularity in a larger geographic area encompassing the particular geographic area, or by some other method. Such preferences may be determined for a plurality of groups of items. Further, multiple preferences may be determined for each group of items for each geographic area.

Then, the map generation application 112, in box 718, sends the preference or preferences and other data to the client 106 over the network 109 (FIG. 1) for rendering to the user. The map generation application 112 then ends.

Figure 8:
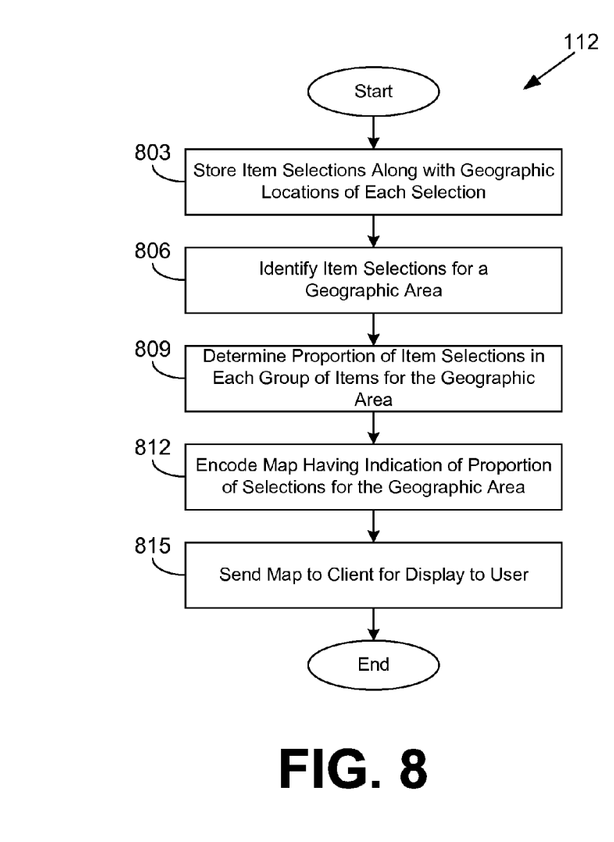
FIG. 8 depicts a flowchart that illustrates another example of functionality implemented as a portion of a map generation application executed in a server in the networked environment of FIG. 1 according to various embodiments of the present disclosure.

With reference to FIG. 8, shown is a flowchart that provides another example of the operation of the map generation application 112 (FIG. 1) according to various embodiments. It is understood that the flowchart of FIG. 8 provides merely an example of the many different types of functional arrangements that may be employed to implement the operation of the map generation application 112 as described herein. As an alternative, the flowchart of FIG. 8 may be viewed as depicting an example of steps of a method implemented in the server 103 (FIG. 1) according to one or more embodiments.

To begin, in box 803, the map generation application 112 associates item selections from the item selection data 121 (FIG. 1) with geographic locations of each selection. This may be performed using addresses or other location data that are associated with each item selection. The associations may be performed in advance and stored in item selection data 121 or another location.

Next, in box 806, the map generation application 112 identifies item selections that are associated with a particular geographic area. This may be performed by determining whether a geographic location associated with an item selection is located within the geographic area. The geographic area may be predetermined and retrieved from map data 122 (FIG. 1) or supplied by a user. If the geographic area is predefined, these determinations may be made prior to any map generation request and stored in item selection data 121, map data 122, or some other location.

The map generation application 112 continues to box 809 and determines the proportion of item selections in each group of items for the geographic area. For example, if there are two groups of items, such as green items and brown items, the map generation application 112 will determine what percentage of item selections within a particular geographic area were for green items and what percentage of the selections in the geographic area were for brown items. In some embodiments, there may be only one group of items, in which case the map generation application 112 may determine which item selections were for items within that particular group of items out of a larger pool of item selections that may not be associated with the particular group of items. Additionally, there may be more than two groups of items in some embodiments.

Subsequently, in box 812, the map generation application 112 encodes a map having indications of the proportions of selections for the geographic area. Such an indication may be, for example, a visual indication, such as a color, pattern, gradient, or some other indication. An indication may be other visual indicia. Other indications, such as audio indications, may also be used.

Finally, in box 815, the map generation application 112 sends the map and potentially other data to the client 106 (FIG. 1) for rendering to the user. In some embodiments, the map may describe multiple geographic areas and may be updated by the map generation application 112 in response to one or more requests generated by users of the client 106. There may be multiple communications between the client 106 and map generation application 112 on the server 103 in order to update the map. Then the map generation application 112 ends.

Figure 9:
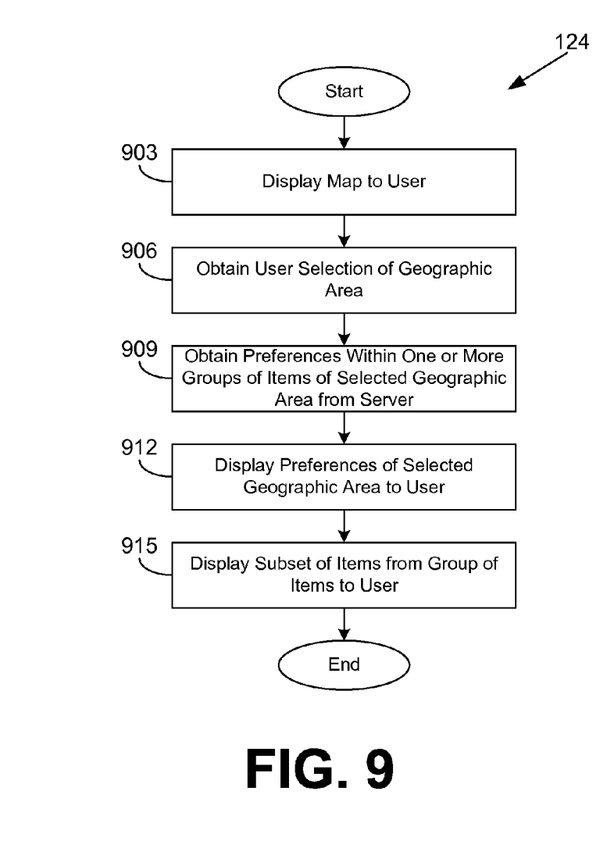
FIG. 9 depicts a flowchart that illustrates one example of functionality executed in a client in the networked environment of FIG. 1 according to various embodiments of the present disclosure.

Moving now to FIG. 9, shown is a flowchart that provides one example of the operation of a browser 124 (FIG. 1) or another application on a client 106 (FIG. 1) according to various embodiments. It is understood that the flowchart of FIG. 9 provides merely an example of the many different types of functional arrangements that may be employed to implement the operation of the browser 124 or other application as described herein. As an alternative, the flowchart of FIG. 9 may be viewed as depicting an example of steps of a method implemented in the client 106 (FIG. 1) according to one or more embodiments.

To begin, in box 903, the browser 124 renders a user interface 600 (FIG. 6) depicting a map 601 (FIG. 6) to the user. This map 601 may be obtained in advance from, for example, the map generation application 112 (FIG. 1). Such a map 601 may be user selectable and may include multiple geographic areas, continuous updates, and potentially other features.

Next, in box 906, the browser 124 obtains a user selection of a geographic area on the map 601. This may involve, for example, the user selecting with a cursor 624 (FIG. 6) a particular geographic area that is predefined or user defined.

The browser 124 then obtains preferences within one or more groups of items of the selected geographic area from the map generation application 112 on the server 103 (FIG. 1) in box 909. This task may involve, for example, sending coordinates defining a geographic area to the map generation application 112 or sending a selection of one or more predefined geographic areas to the map generation application 112.

Then, in box 912, the browser 124 displays preferences associated with the selected geographic area to the user. These preferences may be obtained from the map generation application 112 over the network 109 (FIG. 1).

In some embodiments, in box 915, the browser may display a subset of items 412 (FIG. 4) from a group of items to the user. This subset of items 412 may be based upon the selected geographic area as discussed above. Alternatively, it may be based on other criteria such as popularity of a subset of items 412 within a group of items in a larger geographic area. Then, the map generation application 112 ends.

Figure 10:
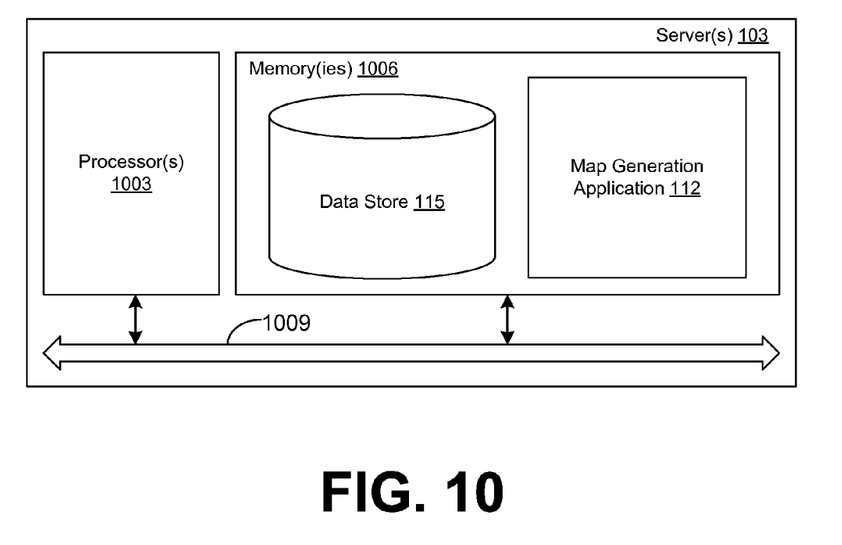
FIG. 10 is a schematic block diagram that provides one example illustration of a server employed in the networked environment of FIG. 1 according to various embodiments of the present disclosure.

Referring next to FIG. 10, shown is a schematic block diagram of one example of a server 103 (FIG. 1) according to an embodiment of the present disclosure. The server 103 includes a processor circuit, for example, having a processor 1003 and a memory 1006, both of which are coupled with a local interface 1009. To this end, the server 103 may comprise, for example, a server computer with such a structure. The local interface 1009 may comprise, for example, a data bus with an accompanying address/control bus or other bus structure.

Stored within the memory 1006 are both executable components and data. In particular, stored in the memory 1006 and executable by the processor 1003 are the map generation application 112 (FIG. 1) and potentially other applications. Also stored in the memory 1006 are the data store 115 (FIG. 1) and other data. In addition, a server operating system may be stored in the memory 1006 and executable by the processor 1003.

It is understood that there may be other applications stored in the memory 1006 and executable by the processor 1003. Also, other data may be stored in the memory 1006 and accessed by the processor 1003 associated with the operation of the map generation application 112. The map generation application 112 may be implemented using any one or a combination of a number of programming languages such as, for example, C, C++, C#, Visual Basic, VBScript, Java, JavaScript, Perl, Ruby, Python, Flash, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although the various components executed on the one or more servers 103 as described above are embodied in software or code executed by general purpose hardware as discussed above, as an alternative the various components executed on the one or more servers 103 as described above may also be embodied in dedicated hardware or a combination of software/general purpose hardware and dedicated hardware. If embodied in dedicated hardware, the various components executed on the one or more servers 103 as described above can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7-9 show the architecture, functionality, and operation of an implementation of the various components executed on the one or more servers 103 as described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 7-9 show a specific order of execution, it is understood that the order of execution may differ from that which is depicted. For example, the order of execution of two or more blocks may be scrambled relative to the order shown. Also, two or more blocks shown in succession in FIGS. 7-9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the various components executed on the one or more servers 103 as described above comprise software or code, they can be embodied in any computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the various components executed on the one or more servers 103 as described above for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method, comprising:
    associating, in a server, each of a plurality of product selections with a respective geographic location, each of the plurality of product selections indicating an interest of a respective customer in a respective one of a plurality of products, each of the plurality of product selections corresponding to a selection of the respective one of the plurality of products for rendering in a network page;
    identifying, in the server, product selections associated with each of a plurality of geographic areas;
    determining, in the server, based at least in part on the identified ones of the product selections, for each of a plurality of groups of products and each of the geographic areas, a geographic product preference for selecting a particular product relative to other products in the group of products, the geographic product preference being associated with the respective one of the geographic areas, each of the plurality of groups of products being a respective predefined subset of the plurality of products;
    encoding, in the server, a map depicting the geographic areas, each respective one of the geographic areas displaying a respective geographic product group preference for selecting products in a particular one of the plurality of groups of products relative to others of the plurality of groups of products, the respective geographic product group preference being determined based at least in part on the identified ones of the product selections; and
    sending the map and at least one of the geographic product preferences to a client for rendering.

2. The computer-implemented method of claim 1, further comprising instructing the client to render a subset of at least one of the plurality of groups of products.

3. The computer-implemented method of claim 1, wherein the product selections are filtered based at least in part on a time period obtained from the client.

4. The computer-implemented method of claim 1, wherein at least one of the plurality of product selections corresponds to a sale of the respective one of the plurality of products.

5. A computer-implemented method, comprising:
    associating, in a server, each of a plurality of item selections with a respective geographic location, each of the plurality of item selections indicating an interest of a respective customer in a respective one of a plurality of items, each of the plurality of item selections corresponding to a selection of the respective one of the plurality of items for rendering in a network page;
    identifying, in the server, item selections associated with a geographic area;
    determining, in the server, based at least in part on the identified ones of the item selections, a geographic item preference for selecting a particular item relative to other items in a group of items, the geographic item preference being associated with the geographic area, the group of items being a predefined subset of the plurality of items;
    encoding, in the server, a map depicting the geographic area in association with the geographic item preference; and
    sending the map and the geographic item preference to a client for rendering to a user.

6. The computer-implemented method of claim 5, wherein the item comprises a product and the group of items comprises a group of products.

7. The computer-implemented method of claim 5, wherein at least one of the plurality of item selections corresponds to a sale of the respective one of the plurality of items.

8. The computer-implemented method of claim 5, wherein identifying the item selections associated with the geographic area and determining the geographic item preference are performed for a plurality of geographic areas.

9. The computer-implemented method of claim 8, wherein determining the geographic item preference further comprises:
    determining a local group share for each item from among the group of items, the local group share being the share of selections of the item out of selections for all of the items in the group of items, each selection being associated with the geographic area;
    determining an overall group share for each item from among the group of items, the overall group share being the share of selections of the item out of selections for all of the items in the group of items, each selection being associated with a super geographic area containing the geographic area and at least one other geographic area; and
    determining the geographic item preference for an item by identifying the item from among the group of items having a greatest difference between the local group share and the overall group share.

10. The computer-implemented method of claim 8, wherein determining a geographic item preference for selecting a particular item relative to other items in a group of items further comprises calculating a ratio based at least in part on a quantity of the identified ones of the item selections and a population of the geographic area.

11. The computer-implemented method of claim 5, further comprising obtaining a definition of the geographic area from the client.

12. The computer-implemented method of claim 5, further comprising instructing the client to render a representation of a subset of the group of items.

13. The computer-implemented method of claim 12, wherein the subset of items comprises items having the most selections of the group, the selections being associated with the geographic area.

14. The computer-implemented method of claim 5, wherein determining the geographic item preference is performed for a plurality of groups of items.

15. The computer-implemented method of claim 14, further comprising:
encoding, in the server, the map depicting the geographic area to display, a geographic item group preference for selecting items in a particular one of the plurality of groups of items relative to others of the plurality of groups of items, the geographic item group preference being determined based at least in part on the identified ones of the item selections.

16. The computer-implemented method of claim 15, further comprising instructing the client to render the geographic item group preference in response to the user selecting the geographic area on the map.

17. A system, comprising:
at least one computing device; and
an application executable in the at least one computing device, the application comprising:
logic that associates each of a plurality of item selections with a respective geographic location, each of the plurality of item selections indicating an interest of a respective customer in a respective one of a plurality of items, each of the plurality of item selections corresponding to a selection of the respective one of the plurality of items for rendering in a network page;
logic that identifies item selections associated with a geographic area;
logic that determines, based at least in part on the identified ones of the item selections, a geographic item preference for selecting a particular item relative to other items in a group of items, the geographic item preference being associated with the geographic area, the group of items being a predefined subset of the plurality of items;
logic that encodes a map depicting the geographic area in association with the geographic item preference; and
logic that sends the map and the geographic item preference to a client for rendering.

18. The system of claim 17, further comprising a data store in the at least one computing device, wherein the application is configured to read item selection data from the data store.

19. The system of claim 17, wherein the item comprises a product and the group of items comprises a group of products.

20. The system of claim 17, wherein at least one of the plurality of item selections corresponds to a sale of the respective one of the items.

21. The system of claim 17, wherein the logic that identifies is configured to identify item selections associated with each of a plurality of geographic areas, and the logic that determines is configured to determine the geographic item preference for each of the geographic areas.

22. The system of claim 21, wherein the logic that determines further comprises:
logic that determines a local group share for each item from among the group of items, the local group share being the share of selections of the item out of selections for all items in the group of items, each selection being associated with the geographic area;
logic that determines an overall group share for each item from among the group of items, the overall group share being the share of selections of the item out of selections for all items in the group of items, each selection being associated with a super geographic area containing the geographic area and at least one other geographic area; and
logic that determines the geographic item preference for an item by identifying the item from among the group of items having a greatest difference between the local group share and the overall group share.

23. The system of claim 21, wherein the logic that determines a geographic item preference for selecting a particular item relative to other items in a group of items further comprises logic that calculates a ratio based at least in part on a quantity of the identified ones of the item selections and a population of the geographic area.

24. The system of claim 17, wherein the application further comprises logic that obtains a definition of the geographic area from the client.

25. The system of claim 17, wherein the application further comprises logic that instructs the client to render a representation of a subset of the group of items.

26. The system of claim 25, wherein the subset of items comprises items having the most selections of the group of items, the selections being associated with the geographic area.

27. The system of claim 17, wherein the logic that determines is configured to determine a respective geographic item preference for each of a plurality of groups of items.

28. The system of claim 27, wherein the logic that encodes the map is further configured to encode the map to display a geographic item group preference for selecting items in a particular one of the plurality of groups of items relative to others of the plurality of groups of items, the geographic item group preference being determined based at least in part on the identified ones of the item selections.

29. The system of claim 28, wherein the application further comprises logic to instruct the client to render the geographic item group preference in response to the user selecting the geographic area on the map.

* * * * *